United States Patent
Xu et al.

(10) Patent No.: US 12,418,931 B2
(45) Date of Patent: Sep. 16, 2025

(54) DYNAMIC SLOT MANAGEMENT OF RADIO FRAMES

(71) Applicant: QUALCOMM Incorporated, San Diego, CA (US)

(72) Inventors: Zhuoqi Xu, Shanghai (CN); Yuankun Zhu, Shanghai (CN); Pan Jiang, Shanghai (CN)

(*) Notice: Subject to any disclaimer, the term of this patent is extended or adjusted under 35 U.S.C. 154(b) by 253 days.

(21) Appl. No.: 17/996,690

(22) PCT Filed: Jun. 5, 2020

(86) PCT No.: PCT/CN2020/094501
§ 371 (c)(1),
(2) Date: Oct. 20, 2022

(87) PCT Pub. No.: WO2021/243668
PCT Pub. Date: Dec. 9, 2021

(65) Prior Publication Data
US 2023/0224940 A1    Jul. 13, 2023

(51) Int. Cl.
*H04W 72/50* (2023.01)
*H04W 72/1263* (2023.01)

(52) U.S. Cl.
CPC ..... *H04W 72/535* (2023.01); *H04W 72/1263* (2013.01)

(58) Field of Classification Search
CPC ........... H04W 72/535; H04W 72/1263; H04W 72/0446; H04W 72/56; H04W 28/0284; H04W 28/16; H04W 24/10; H04W 52/343
See application file for complete search history.

(56) References Cited

U.S. PATENT DOCUMENTS 11,202,292 B1 *  12/2021  Parihar ................. H04L 5/0053
2012/0054258 A1    3/2012  Li et al.
(Continued)

FOREIGN PATENT DOCUMENTS

CN          106888480 A        6/2017

OTHER PUBLICATIONS

Ericsson: "pCR on TR 32.860-020 on Problems Modifying D-MLB Decision by NM," 3GPP TSG SA WG5 (Telecom Management) Meeting #94, S5-140620, Mar. 24-28, 2014 (Mar. 28, 2014), 5 pages, the whole document.
(Continued)

*Primary Examiner* — Romani Ohri

(57) ABSTRACT

Certain aspects of the present disclosure provide techniques for dynamic slot management for radio frames. A method that may be performed by abase station (BS) includes determining a physical resource block (PRB) utilization of each active slot of a plurality of active slots over a first monitoring period of time. The method also includes calculating, based on the PRB utilization of each of the plurality of active slots, a PRB average utilization value over the first monitoring period of time. The method further includes determining whether the PRB average utilization value satisfies a first PRB threshold value. The method also includes in response to determining that the PRB average utilization value fails to satisfy the first PRB threshold value, deactivating a set of active slots of the plurality of active slots resulting in a modified plurality of active slots over the first monitoring period of time.

20 Claims, 7 Drawing Sheets

(56) References Cited

U.S. PATENT DOCUMENTS

2015/0319705 A1* 11/2015 Yoon .................. H04W 52/343
                                                                 370/235
2015/0365889 A1* 12/2015 Rajendran ............ H04W 16/08
                                                                 455/453
2024/0397507 A1* 11/2024 Chakraborty ...... H04B 7/18539

OTHER PUBLICATIONS

International Search Report and Written Opinion—PCT/CN2020/094501—ISA/EPO—Mar. 3, 2021.
Nokia, et al., "CQI Reporting Mode Enhancements for URLLC," 3GPP TSG-RAN WG1 Meeting #94, R1-1808575, Aug. 20-24, 2018 (Aug. 24, 2018), 5 pages, the whole document.
Nokia, et al., "On UCI Enhancements for URLLC," 3GPP TSG RAN WG1 Meeting #95, R1-1813114, Nov. 12-16, 2018, (Nov. 16, 2018), 10 pages, the whole document.

* cited by examiner

DYNAMIC SLOT MANAGEMENT OF RADIO FRAMES

CROSS-REFERENCE TO RELATED APPLICATIONS

This application is a national stage application under 35 U.S.C. 371 of PCT/CN2020/094501 filed Jun. 5, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for dynamically managing slots of a radio frame.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include reduced power consumption in a radio network (e.g., a wireless communication network) and improved power management of a radio network.

Certain aspects of the subject matter described in this disclosure can be implemented in a method for wireless communication by a user equipment (UE). The method generally includes determining a physical resource block (PRB) utilization of each active slot of a plurality of active slots over a first monitoring period of time. The method also includes calculating, based on the PRB utilization of each of the plurality of active slots, a PRB average utilization value over the first monitoring period of time. The method further includes determining whether the PRB average utilization value satisfies a first PRB threshold value. The method also includes in response to determining that the PRB average utilization value fails to satisfy the first PRB threshold value, deactivating a set of active slots of the plurality of active slots resulting in a modified plurality of active slots over the first monitoring period of time.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
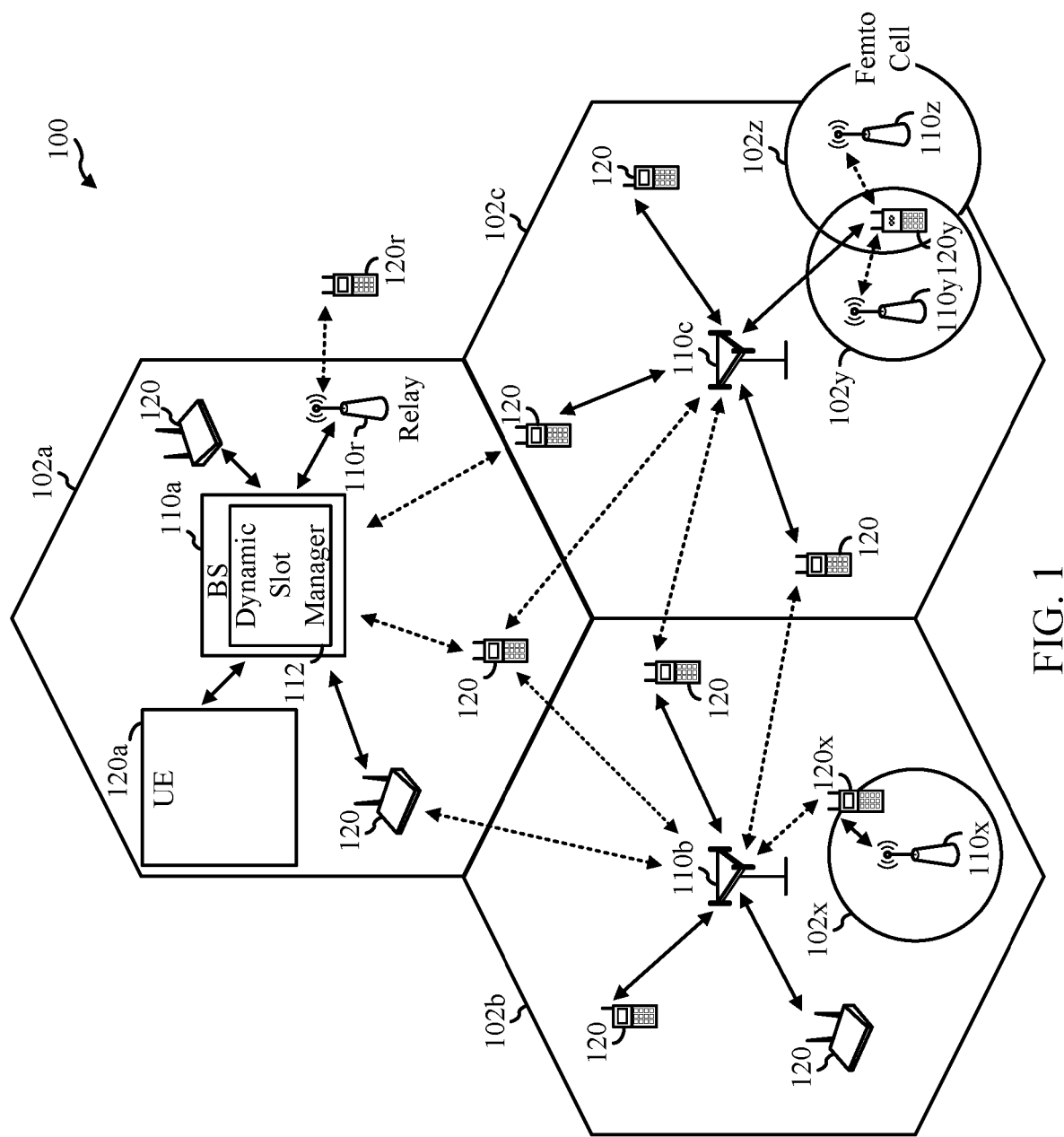
FIG. 1 is a block diagram conceptually illustrating an example wireless communication network, in accordance with certain aspects of the present disclosure.
Figure 1:
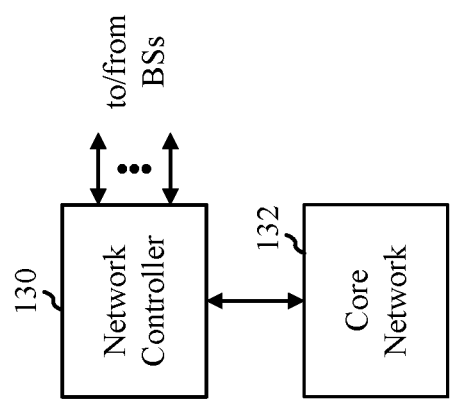

Aspects of the present disclosure provide apparatus, methods, processing systems, and computer readable mediums for dynamically managing activation and/or deactivation of one or more slots of a radio frame in a wireless communications network to reduce power consumption at base stations and user equipments, and improve power management efficiency of the wireless communication network.

For example, a base station (BS) may be configured to transmit one or more scheduling grants (e.g., downlink scheduling grant, uplink scheduling grant, and the like) to one or more user equipments (UEs) for each slot of one or more radio frames in a wireless communication network comprising the BS and the one or more UEs. However, when the amount of network traffic is not heavy, then the BS and the one or more UEs may satisfy various operational and/or performance metrics without the BS transmitting schedule grants to the one or more UEs for all slots of each radio frame. Furthermore, when the amount of network traffic is not heavy, then it may be less power efficient to transmit schedule grants for all slots of each radio frame, as it may cause the BS and the one or more UEs to consume more power.

Accordingly, certain aspects of the present disclosure provide various techniques to reduce power consumption of one or more base stations (BSs) and the one or more UEs of a wireless communication network, while satisfying various operational and/or performance metrics of the wireless communication network by the one or more BSs and the one or more UEs. In certain aspects, the techniques for reducing power consumption of the one or more BSs and the one or more UEs while satisfying various operational and/or performance metrics of the wireless communication network are based on determining network traffic conditions of the wireless communication network, and dynamically activating and/or deactivating one or more slots of a radio frame based on the network traffic.

In certain aspects, the techniques for determining network traffic is based on determining a physical resource block (PRB) utilization of each active slot over a monitoring period of time and determining a PRB average utilization value over the monitoring period of time based on the PRB utilization of each active slot. In certain aspects, the techniques for dynamically deactivating one or more slots of a radio frame are based on transmitting one or more scheduling grants for only slots that fail to satisfy a certain threshold PRB utilization value when the PRB average utilization value fails to satisfy a certain PRB threshold value over the monitoring period of time. In certain aspects, the techniques for activating one or more deactivated slots of the radio frame are based on transmitting scheduling grants for the deactivated slots when the PRB utilization average value satisfies a certain threshold PRB utilization value.

In certain aspects, a PRB utilization value of a slot, as described herein, may be a number of PRBs used for communication in the slot divided by a total number of PRBs available for the slot. In certain aspects, a PRB average utilization value, as described herein, may be an average of the PRB utilization value of each of active slot. In certain aspects, an active slot, as described herein, may be a slot used for communication between a BS and a UE. In certain aspects, a deactivated slot, as described herein, may be a slot that is not used for communication between a BS and a UE.

The following description provides examples of dynamic slot management of a radio frame in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the BSs 110 may be configured for dynamically managing slots of radio frames used in communication with between the BS 110 and one or more UEs 120. As shown in FIG. 1, the BS 110a includes a dynamic slot manager 112 that is configured to dynamically activate and/or deactivate one or more slots of a radio frame, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
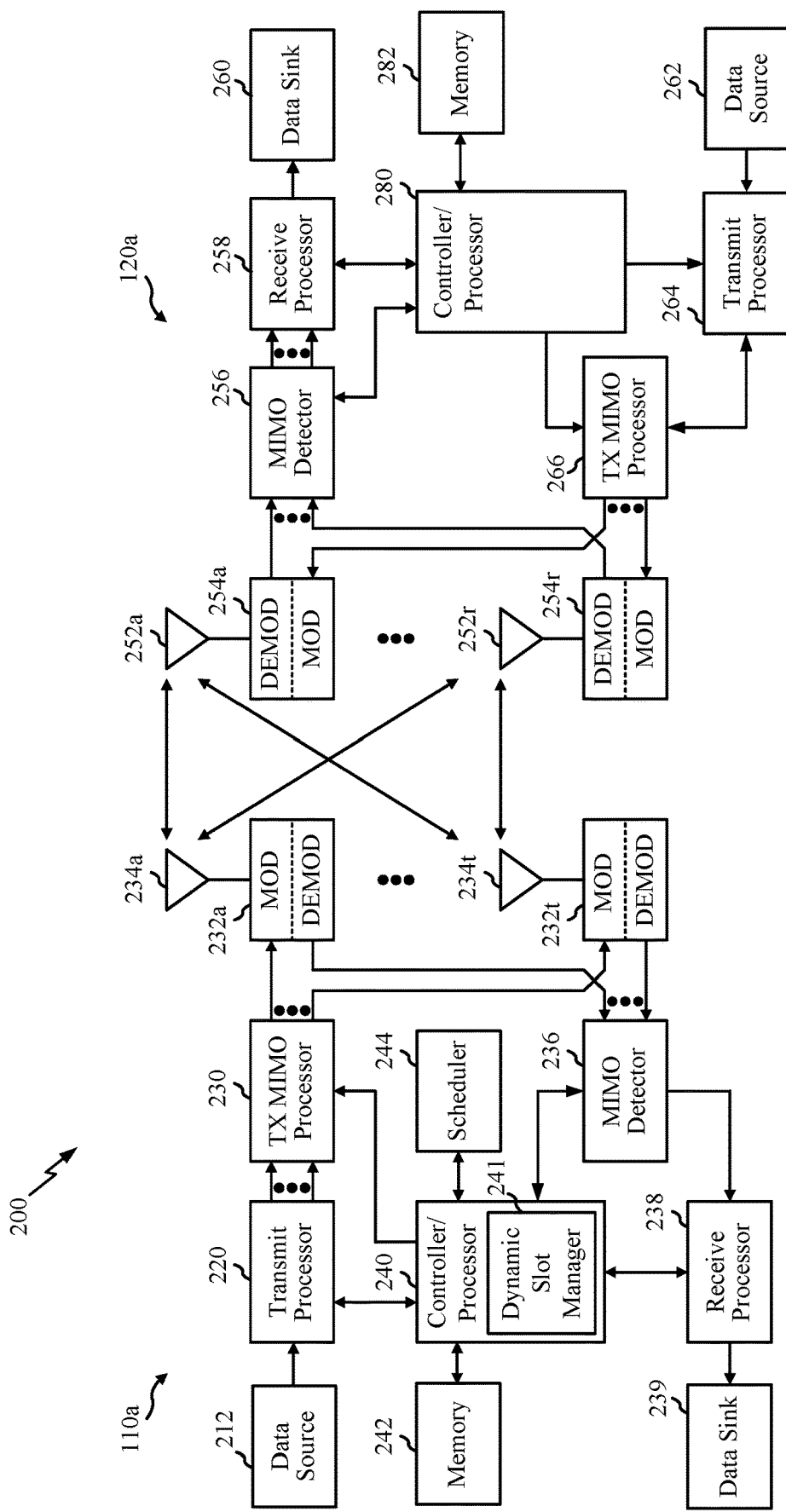
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a dynamic slot manager 241 that is configured to dynamically activate and/or deactivate one or more slots of a radio frame, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
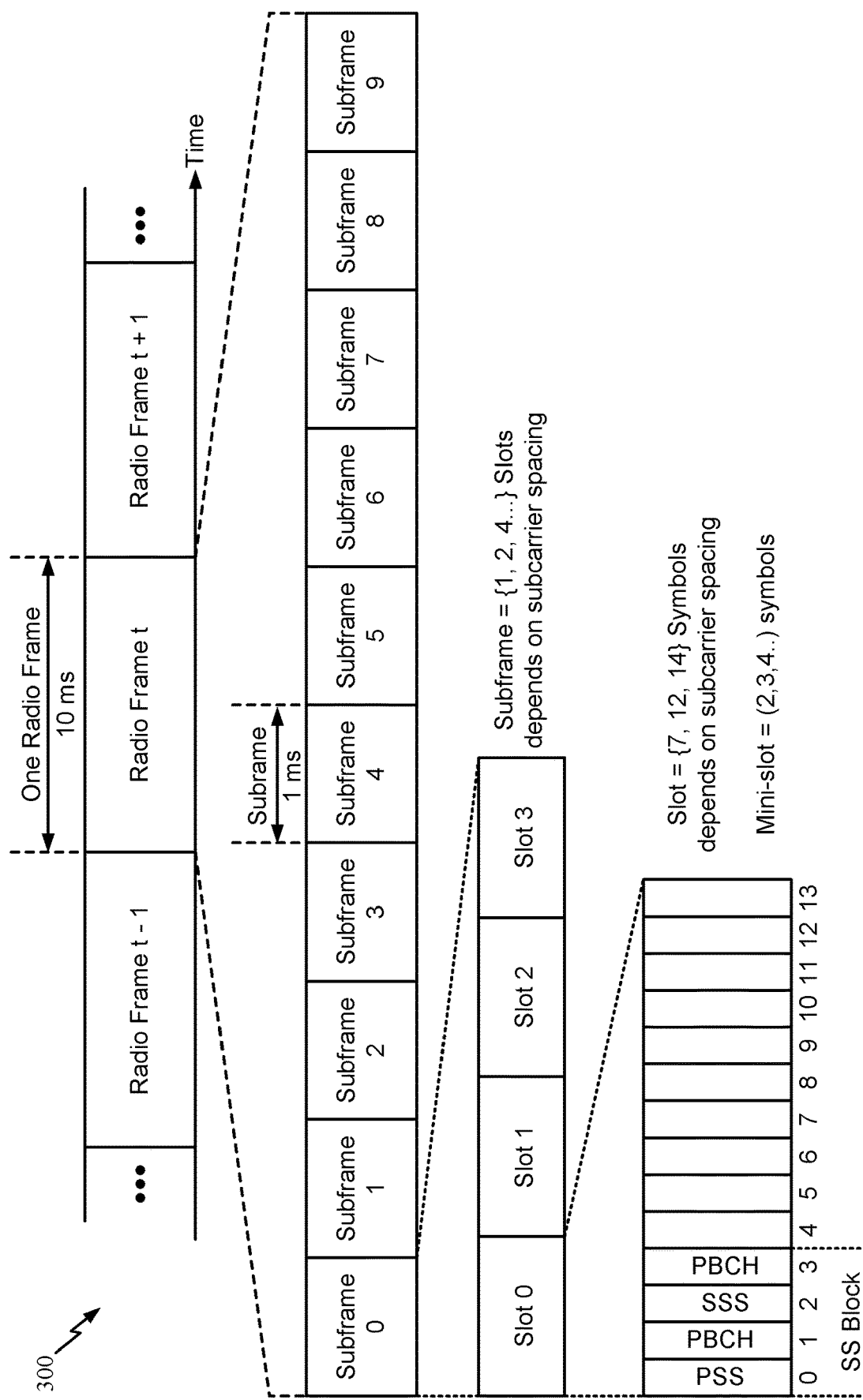
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
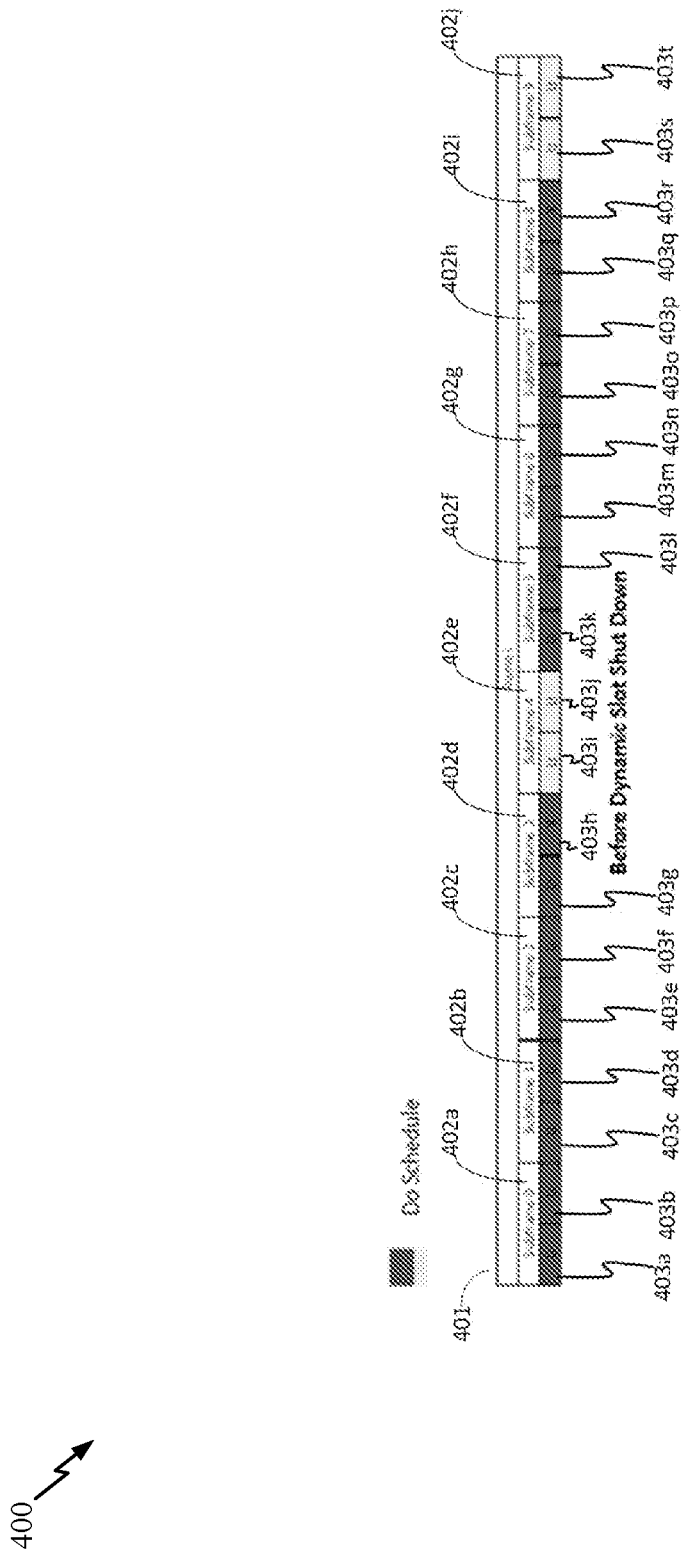
FIG. 4 is an example radio frame for certain wireless communication systems.

FIG. 4 illustrates a diagram showing an example radio frame 401 in the time domain. In certain aspects, the duration of the radio frame 401 may be 10 milliseconds (ms). The radio frame 401 may be divided into one or more subframes, such as subframes 402a, 402b, 402c, 402d, 402e, 402f, 402g, 402h, 402i, 402j, collectively referred to herein as subframes 402. In certain aspects, each subframe 402 of the radio frame 401 may be divided into one or more slots. For example, as shown in FIG. 4, subframe 402a is divided into slots 403a and 403b, subframe 402b is divided into slots 403c and 403d, subframe 402c is divided into slots 403e and 403f, subframe 402d is divided into slots 403g and 403h, subframe 402e is divided into slots 403i and 403j, subframe 402f is divided into slots 403k and 403l, subframe 402g is divided into slots 403m and 403n, subframe 402h is divided into slots 403o and 403p, subframe 402i is divided into slots 403q and 403r, subframe 402j is divided into slots 403s and 403t.

The slots 403a, 403b, 403c, 403d, 403e, 403f, 403g, 403h, 403i, 403j, 403k, 403l, 403m, 403n, 403o, 403p, 403q, 403r, 403s, 403t, may be collectively referred to herein as slots 403. The subcarrier spacing of the radio frame 401, as shown in the example of FIG. 4, may be 30 KHz. The slot format of the slots 403, as shown in the example of FIG. 4, may be "DDDDDDDXUU," where the symbols of slots 403a-403g and 403k-403q are downlink (DL) symbols, the symbols of slots 403h and 403r are flexible symbols, and the symbols of slots 403i-403j and 403s-403t are uplink (UL) symbols.

As described above, a BS may configured to ignore and/or disregard network traffic conditions and transmit scheduling grants to one or more UEs for all of the slots 403 of radio frame 401. However, as described above, transmitting scheduling grants for all of the slots of a radio frame may result in higher power consumption by the BS and the one or more UEs and may not be necessary to satisfy operational and/or performance metrics of a communications network when the network traffic is not heavy.

Accordingly, what is needed are techniques and apparatus for dynamically managing slots of a radio frame based on the network traffic to reduce power consumption in communication network.

Example Dynamic Slot Management of a Radio Frame

Aspects of the present disclosure provide techniques for dynamically activating and/or deactivating slots of a radio frame based on the network traffic to reduce power consumption in communication network while satisfying operational and/or performance metrics of the communication network.

Figure 5:
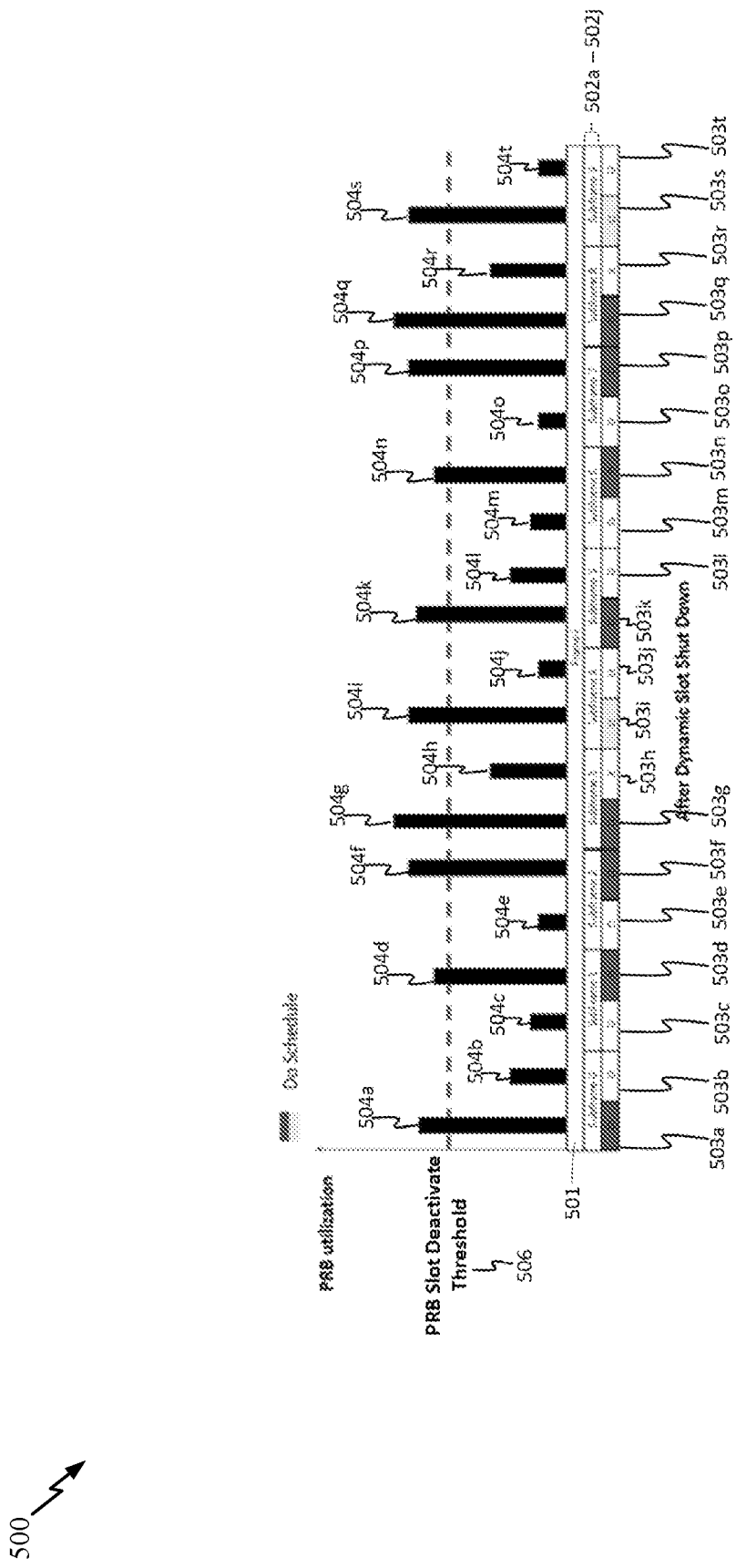
FIG. 5 is an example graph illustrating physical resource block utilization of slots of a radio frame and a physical resource block slot threshold value.

FIG. 5 illustrates a diagram illustrating a graph of PRB utilization of each slot of a radio frame 501. The radio frame 501 may be similar to the radio frame 401. For example, the duration of radio frame 501 may be 10 ms. Similarly, the radio frame 501 may be divided into one or more subframes, such as subframes 502a, 502b, 502c, 502d, 502e, 502f, 502g, 502h, 502i, 502j, collectively referred to herein as subframes 502. Each subframe 502 of the radio frame 501 may be divided into one or more slots. The number of slots of the radio frame 501 may be based on the subcarrier spacing of the radio frame 501.

For example, the subcarrier spacing of the radio frame 501 may be 30 KHz, and each subframe 502 may be divided into two slots. For example, as shown in FIG. 5, subframe 502a may be divided into slots 503a and 503b, subframe 502b may be divided into slots 503c and 503d, subframe 502c may be divided into slots 503e and 503f, subframe 502d may be divided into slots 503g and 503h, subframe 502e may be divided into slots 503i and 503j, subframe 502f may be divided into slots 503k and 503l, subframe 502g may be divided into slots 503m and 503n, subframe 502h may be divided into slots 503o and 503p, subframe 502i may be divided into slots 503q and 503r, subframe 502j may be divided into slots 503s and 503t. The slots 503a, 503b, 503c, 503d, 503e, 503f, 503g, 503h, 503i, 503j, 503k, 503l, 503m, 503n, 503o, 503p, 503q, 503r, 503s, 503t, may be collectively referred to herein as slots 503

The BS 110 may be configured to determine (e.g., via the dynamic slot manager 112, 241) a PRB utilization value of the slots 503 over a deactivating monitoring period of time. The BS 110 (e.g., via the dynamic slot manager 112, 241) may be configured to determine a PRB utilization value of a slot 503 according to the following equation:

$$\frac{PRB_i}{PRB_{MAX}}, \quad \text{(equation 1)}$$

where $PRB_i$ indicates the number of PRBs utilized for communication (e.g., communication between the BS 110 and a UE 120) in the $i^{th}$ slot (e.g., slot 503c) of a radio frame (e.g., radio frame 501), and where the $PRB_{MAX}$ indicates the total or maximum number of PRBs available for the $i^{th}$ slot. In certain aspects, the $PRB_{MAX}$ value may be a predetermined default value of 273 PRBs. In certain aspects, the deactivating monitoring period of time may be a predetermined default value of one minute.

An example of the determined PRB utilization values of the slots 503 over the deactivating monitoring period of time is shown in FIG. 5. In FIG. 5, PRB utilization values 504a, 504b, 504c, 504d, 504e, 504f, 504g, 504h, 504i, 504j, 504k, 504l, 504m, 504n, 504o, 504p, 504q, 504r, 504s, and 504t are the PRB utilization values of the slots 503a, 503b, 503c, 503d, 503e, 503f, 503g, 503h, 503i, 503j, 503k, 503l, 503m, 503n, 503o, 503p, 503q, 503r, 503s, and 503t, respectively. The PRB utilization values 504a, 504b, 504c, 504d, 504e, 504f, 504g, 504h, 504i, 504j, 504k, 504l, 504m, 504n, 504o, 504p, 504q, 504r, 504s, 504t may be collectively referred to herein as PRB utilization values 504.

The BS 110 (e.g., via the dynamic slot manager 112, 241) may be configured to determine a PRB average utilization value over a deactivating monitoring period of time based on the PRB utilization values 504 of the active slots 503 determined over the deactivating monitoring period of time. For example, if the slots 503b, 503c, 503e, 503h, 503j, 503l, 503m, 503o, 503r, and 503t are deactivated, then the corresponding PRB utilization values 504 of these slots will be disregarded in determining the PRB average utilization value. In certain aspects, the PRB average utilization value over a deactivating monitoring period of time may be determined based on the following equation:

$$PRB \text{ Average Utilization value} = \Sigma_i^n \frac{PRB_i}{PRB_{MAX}}. \quad \text{(equation 2)}$$

where i is the $i^{th}$ active slot of a radio frame (e.g., radio frame 501), where n is the $n^{th}$ active slot of the radio frame, where $PRB_i$ indicates the number of PRBs utilized for communication in the $i^{th}$ active slot over the deactivating monitoring period of time, and where $PRB_{MAX}$ is the indicates the total and/or maximum number of PRBs available for the $i^{th}$ slot.

In certain aspects, if all of the slots of the radio frame are active slots, then i=$0^{th}$ slot of the radio frame (e.g., slot 503a) and n=maximum slot of the radio frame (e.g., slot 503t). In certain aspects, if some of the slots of the radio frame are deactivated, then i=first active slot of the radio frame, and n=the last active slot of the radio frame. For example, if slots 503a, 503b, 503c, 503h, 503j, 503l, 503m, 503r, and 503t are deactivated, then the first active slot will be 503d, and the last active slot will be 503s, then i=503d and n=503s. Continuing with the previous example, the BS 110 (e.g., via dynamic slot manager 112, 241) can calculate the PRB average utilization value over the deactivating monitoring period of time using equation 2 and PRB utilization values of slots 503d, 503e, 503f, 503g, 503i, 503k, 503n, 503o, 503p, 503q, and 503s. In certain aspects, the PRB average utilization value may be determined and/or calculated as a percentage.

The BS 110 (e.g., via dynamic slot manager 112, 241) may be configured to determine whether the PRB utilization average value fails to satisfy a PRB threshold value. If the BS 110 (e.g., via dynamic slot manager 112, 241) determines that the PRB average utilization value fails to satisfy the PRB threshold value, then the BS 110 (e.g., via dynamic slot manager 112, 241) may determine that one or more active slots 503 of the radio frame 501 can be deactivated. If the BS 110 (e.g., via dynamic slot manager 112, 241) determines that the PRB average utilization value satisfies the PRB threshold value, then the BS 110 may determine that none of the active slots need to be deactivated. In certain aspects, the PRB threshold value may be predetermined to be a default value of 30%.

If the BS 110 determines that one or more active slots 503 of the radio frame 501 can be deactivated, then the BS 110 (e.g., via dynamic slot manager 112, 241) may be configured to identify a subset of the active slots 503 by determining whether the corresponding PRB utilization values 504 fail to satisfy a PRB slot deactivate threshold value 506. For example, if all slots 503 are active, then the BS 110 may determine whether the corresponding PRB utilization values 504 satisfy the PRB slot deactivate threshold value 506, and if a PRB utilization value 504 fails to satisfy the PRB slot deactivate threshold value 506, then the corresponding slot 503 may be deactivated. Continuing with the previous example, and as can be seen in FIG. 5, the PRB utilization values of 504b, 504c, 504e, 504h, 504j, 504l, 504m, 504o, 504r, and 504t fail to satisfy the PRB slot deactivate threshold value 506. Therefore the BS 110 (via dynamic slot manager 112, 241) may add deactivate the slots 503b, 503c, 503e, 503h, 503j, 503l, 503m, 503o, 503r, and 503t.

As described above, the BS 110 (e.g., via dynamic slot manager 112, 241) may be configured to deactivate a slot of a radio frame by not transmitting a scheduling grant for the slot to one or more UEs 120. Therefore, continuing with the previous example, the BS 110 may deactivate the slots 503b, 503c, 503e, 503h, 503j, 503l, 503m, 503o, 503r, and 503t by not transmitting scheduling grants for these slots. In certain aspects, the BS 110 (e.g., via dynamic slot manager 112, 241) may store, update, and/or maintain a list of active slots of a frame and a list of deactivated slots of the frame. In certain aspects, the BS 110 (e.g., via dynamic slot manager 112, 241) may transmit one or more scheduling grants to one or more UEs 120 for only slots listed in the list of active slots. In certain aspects, the BS 110 (e.g., via dynamic slot manager 112, 241) may deactivate one or more slots in a sequential order. In certain aspects, the BS 110 (e.g., via dynamic slot manager 112, 241) may deactivate one or more slots in a sequential order based on the PRB utilization value of the slot. For example, the slot with lowest PRB utilization value that fails to satisfy the PRB slot deactivate threshold value may be deactivated first.

In certain aspects, the PRB slot deactivate threshold value may be the same value as the PRB threshold value. In certain aspects, the PRB slot deactivate threshold value may be different from the PRB threshold value. For example, the PRB slot deactivate threshold value may be less than the PRB threshold value or greater than the PRB threshold value.

The BS 110 (e.g., via dynamic slot manager 112, 241) may be configured to activate one or more deactivated slots by determining a PRB average utilization value, using the above equation 2, over an activate monitoring period of time and determining whether the PRB average utilization value over the activate monitoring period of time satisfies a PRB activate threshold value. In certain aspects, the activate monitoring period of time may be different from the deactivating monitoring period of time. In certain aspects, the activate monitoring period of time may be predetermined to a default value of one second. In certain aspects, the PRB activate threshold value may be predetermined to a default value of 70%.

If the BS 110 determines that the PRB average utilization value over the activate monitoring period of time satisfies a PRB activate threshold value, then the BS 110 may identify one or more deactivated slots and activate them by transmitting one or more scheduling grants to one or more UEs for the one or more deactivated slots. For example, if the BS 110 determines that the PRB average utilization value over the activate monitoring period of time satisfies the PRB activate threshold value and if slots 503b, 503c, 503e, 503h, 503j, 503l, 503m, 503o, 503r, and 503t are currently deactivated, then BS 110 may activate these slots by transmitting scheduling grants to one or more UEs for these slots. In certain aspects, the BS 110 may update the list of active slots by including such recently activated slots.

If the BS 110 determines that the PRB average utilization value over the activate monitoring period of time fails to satisfy a PRB activate threshold value, then the BS 110 may not make any changes to the active and deactivated slots. In certain aspects, the BS 110 may be configured to activate one or more deactivated slots based on a sequential order. For example, the BS 110 may be configured to activate one or more slots in the order in which they were deactivated. Similarly, in another example, the BS 110 may be configured to activate one or more slots in the reverse order in which they were deactivated such that the slot that was deactivated last will be activated first.

Figure 6:
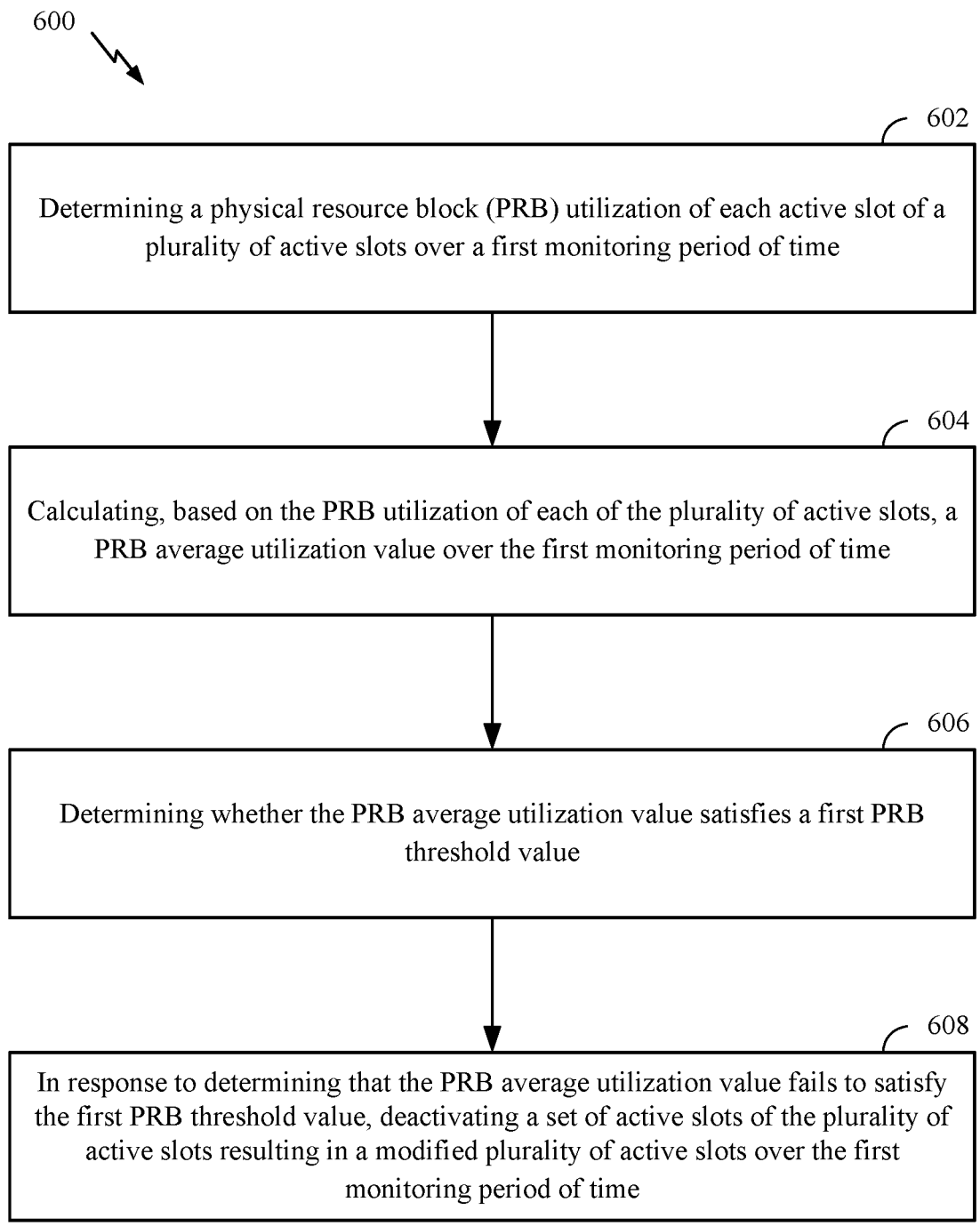
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., the BS 110a in the wireless communication network 100). The operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 602, where the BS (e.g., BS 110) determines a physical resource block (PRB) utilization (e.g., PRB utilization value) of each active slot (e.g., slot 503) of a plurality of active slots over a first monitoring period of time (e.g., a deactivating monitoring period). At 604, the BS calculates, based on the PRB utilization of each of the plurality of active slots, a PRB average utilization value over the first monitoring period of time. At 606, the BS determines whether the PRB average utilization value satisfies a first PRB threshold value (e.g., PRB threshold value). At 608, the BS, in response to determining that the PRB average utilization value fails to satisfy the first PRB threshold value, deactivates a set of active slots of the plurality of active slots resulting in a modified plurality of active slots over the first monitoring period of time.

In certain aspects, in response to determining that the PRB average utilization value fails to satisfy the first PRB threshold value, the BS may transmit one or more scheduling grants to one or more user equipments (UEs) for only the modified plurality of active slots over the first monitoring period. In certain aspects, in response to determining that the PRB average utilization value satisfies the first PRB threshold value, the BS may transmit one or more scheduling grants to one or more user equipments (UEs) for the plurality of active slots over the first monitoring period. In certain aspects, the PRB utilization of each active slot of the set of active slots may fail to satisfy a PRB slot threshold value.

In certain aspects, where deactivating the set of active slots of the plurality of active slots by the BS, comprises determining, by the BS, the set of active slots based on the PRB utilization of each active slot of the plurality of active slots, a sequential order of the plurality of active slots, and a PRB slot threshold value. In certain aspects, the set of active slots are determined as one or more of the plurality of active slots in sequential order that fail to satisfy the PRB slot threshold value.

In certain aspects, the BS determines whether a second PRB average utilization value (e.g., PRB average utilization value over the PRB activate monitoring period of time) based on PRB utilization values of the modified plurality of active slots over a second monitoring period of time (e.g., the PRB activate monitoring period of time) satisfies a second PRB threshold value (e.g., PRB activate threshold value), and response to determining that the second PRB average utilization value satisfies the second PRB threshold value, the BS reactivates one or more of the deactivated set of active slots resulting in a second modified plurality of active slots.

In certain aspects, the value of the first PRB threshold value is different from the value of the second PRB threshold value (e.g., PRB activate threshold value). In certain aspects, the first monitoring period of time (e.g., deactivating monitoring period of time) is greater than the second monitoring period of time (e.g., activate monitoring period of time). In certain aspects, the PRB utilization of a given slot comprises a number of PRBs used for communication in the given slot divided by a total number of PRBs available in the given slot. In certain aspects, the PRB average utilization value comprises an average of the PRB utilization of each of the plurality of active slots. In certain aspects, an active slot is used for communication, and wherein a deactivated slot is not used for communication.

Figure 7:
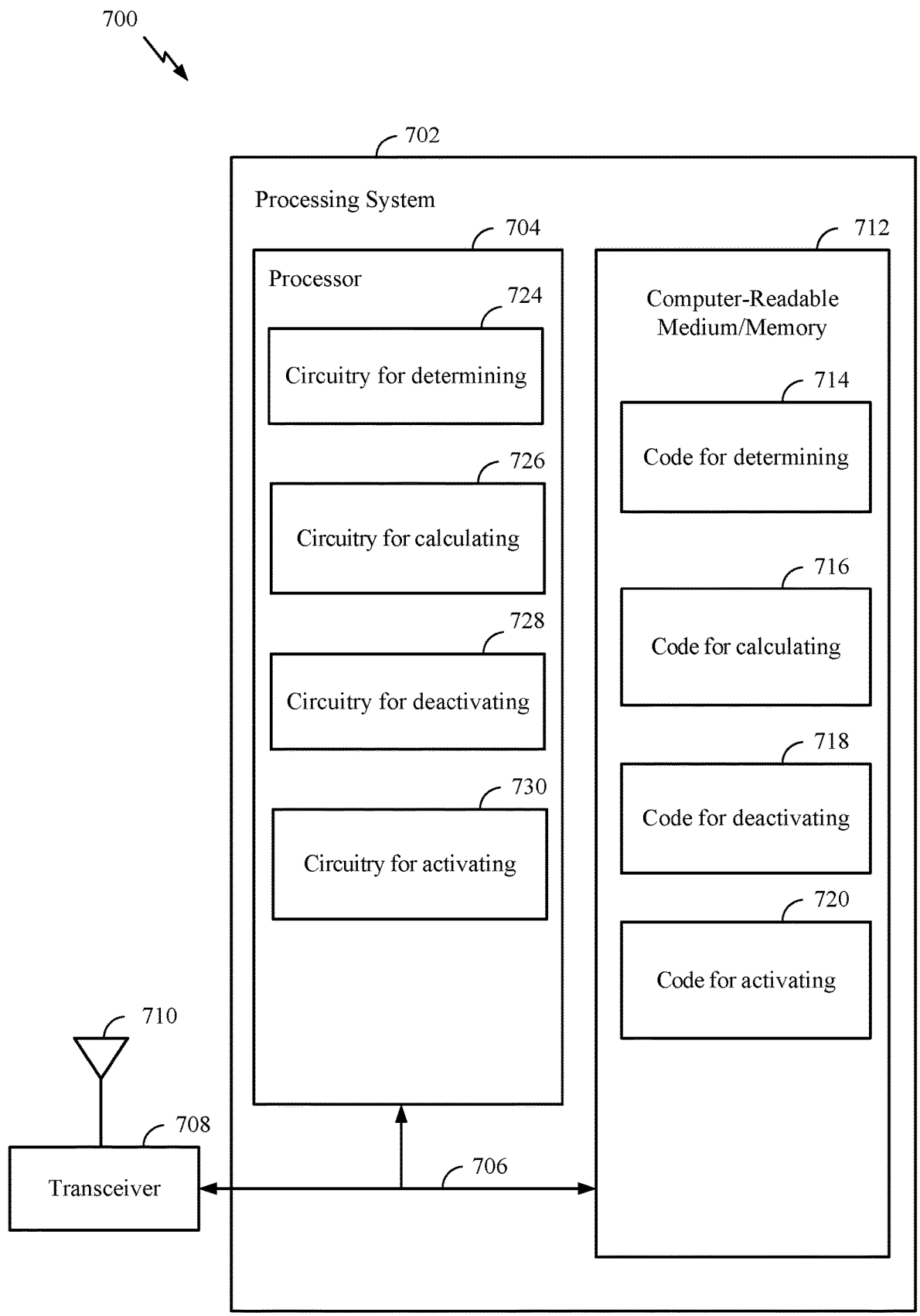
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 6. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 6, or other operations for performing the various techniques discussed herein for dynamic slot management of a radio frame. In certain aspects, computer-readable medium/memory 712 stores code 714 for determining; code 716 for calculating; code 718 for deactivating; and code 720 for activating. In certain aspects, the processor 704 has circuitry configured to implement the code stored in the computer-readable medium/memory 712. The processor 704 includes circuitry 724 for determining; circuitry 726 for calculating; circuitry 728 for deactivating; and circuitry 730 for activating.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a base station, comprising:
    determining a physical resource block (PRB) utilization of each active slot of a plurality of active slots over a first monitoring period of time, wherein the PRB utilization of a given slot comprises a number of PRBs used for communication in the given slot divided by a total number of PRBs available in the given slot;
    calculating, based on the PRB utilization of each of the plurality of active slots, a PRB average utilization value over the first monitoring period of time;
    determining whether the PRB average utilization value satisfies a first PRB threshold value; and
    in response to determining that the PRB average utilization value fails to satisfy the first PRB threshold value, deactivating a set of active slots of the plurality of active slots resulting in a modified plurality of active slots over the first monitoring period of time, wherein the PRB utilization of each active slot of the set of active slots fails to satisfy a PRB slot threshold value.

2. The method of claim 1, further comprising:
    in response to determining that the PRB average utilization value fails to satisfy the first PRB threshold value, transmitting one or more scheduling grants to one or more user equipments (UEs) for only the modified plurality of active slots over the first monitoring period.

3. The method of claim 1, further comprising:
    in response to determining that the PRB average utilization value satisfies the first PRB threshold value, transmitting one or more scheduling grants to one or more user equipments (UEs) for the plurality of active slots over the first monitoring period.

4. The method of claim 1, wherein deactivating the set of active slots of the plurality of active slots comprises:
    determining the set of active slots based on the PRB utilization of each active slot of the plurality of active slots, a sequential order of the plurality of active slots, and the PRB slot threshold value.

5. The method of claim 4, wherein the set of active slots are determined as one or more of the plurality of active slots in sequential order that fail to satisfy the PRB slot threshold value.

6. The method of claim 1, further comprising:
    determining whether a second PRB average utilization value based on PRB utilization values of the modified plurality of active slots over a second monitoring period of time satisfies a second PRB threshold value; and
    in response to determining that the second PRB average utilization value satisfies the second PRB threshold value, activating one or more of the deactivated set of active slots resulting in a second modified plurality of active slots.

7. The method of claim 6, wherein the first PRB threshold value is different than the second PRB threshold value.

8. The method of claim 6, wherein the first monitoring period of time is greater than the second monitoring period of time.

9. The method of claim 1, wherein the PRB average utilization value comprises an average of the PRB utilization of each of the plurality of active slots.

10. The method of claim 1, wherein an active slot is used for communication, and wherein a deactivated slot is not used for communication.

11. A base station (BS) comprising:
memory; and
one or more processors coupled to the memory, wherein the one or more processors are configured, individually or collectively, to:
determine a physical resource block (PRB) utilization of each active slot of a plurality of active slots over a first monitoring period of time, wherein the PRB utilization of a given slot comprises a number of PRBs used for communication in the given slot divided by a total number of PRBs available in the given slot;
calculate, based on the PRB utilization of each of the plurality of active slots, a PRB average utilization value over the first monitoring period of time;
determine whether the PRB average utilization value satisfies a first PRB threshold value; and
in response to determining that the PRB average utilization value fails to satisfy the first PRB threshold value, deactivate a set of active slots of the plurality of active slots resulting in a modified plurality of active slots over the first monitoring period of time, wherein the PRB utilization of each active slot of the set of active slots fails to satisfy a PRB slot threshold value.

12. The BS of claim 11, wherein the one or more processors are configured, individually or collectively, to:
in response to determining that the PRB average utilization value fails to satisfy the first PRB threshold value, transmitting one or more scheduling grants to one or more user equipments (UEs) for only the modified plurality of active slots over the first monitoring period.

13. The BS of claim 11, wherein the one or more processors are configured, individually or collectively, to:
in response to determining that the PRB average utilization value satisfies the first PRB threshold value, transmitting one or more scheduling grants to one or more user equipments (UEs) for the plurality of active slots over the first monitoring period.

14. A base station (BS) comprising:
memory; and
one or more processors coupled to the memory, wherein the one or more processors are configured, individually or collectively, to:
determine a physical resource block (PRB) utilization of each active slot of a plurality of active slots over a first monitoring period of time;
calculate, based on the PRB utilization of each of the plurality of active slots, a PRB average utilization value over the first monitoring period of time;
determine whether the PRB average utilization value satisfies a first PRB threshold value; and
in response to determining that the PRB average utilization value fails to satisfy the first PRB threshold value, deactivate a set of active slots of the plurality of active slots resulting in a modified plurality of active slots over the first monitoring period of time and transmit one or more scheduling grants to one or more user equipments (UEs) for only the modified plurality of active slots over the first monitoring period, wherein the PRB utilization of each active slot of the set of active slots fails to satisfy a PRB slot threshold value.

15. The BS of claim 14, wherein the PRB utilization of a given slot comprises a number of PRBs used for communication in the given slot divided by a total number of PRBs available in the given slot.

16. The BS of claim 14, wherein the one or more processors are configured, individually or collectively, to:
in response to determining that the PRB average utilization value satisfies the first PRB threshold value, transmit one or more scheduling grants to one or more user equipments (UEs) for the plurality of active slots over the first monitoring period.

17. A method for wireless communication by a base station, comprising:
determining a physical resource block (PRB) utilization of each active slot of a plurality of active slots over a first monitoring period of time;
calculating, based on the PRB utilization of each of the plurality of active slots, a PRB average utilization value over the first monitoring period of time;
determining whether the PRB average utilization value satisfies a first PRB threshold value; and
in response to determining that the PRB average utilization value fails to satisfy the first PRB threshold value, deactivating a set of active slots of the plurality of active slots resulting in a modified plurality of active slots over the first monitoring period of time and transmitting one or more scheduling grants to one or more user equipments (UEs) for only the modified plurality of active slots over the first monitoring period, wherein the PRB utilization of each active slot of the set of active slots fails to satisfy a PRB slot threshold value.

18. The method of claim 17, wherein the PRB utilization of a given slot comprises a number of PRBs used for communication in the given slot divided by a total number of PRBs available in the given slot.

19. The method of claim 17, further comprising:
in response to determining that the PRB average utilization value satisfies the first PRB threshold value, transmitting one or more scheduling grants to one or more user equipments (UEs) for the plurality of active slots over the first monitoring period.

20. The method of claim 17, wherein deactivating the set of active slots of the plurality of active slots comprises:
determining the set of active slots based on the PRB utilization of each active slot of the plurality of active slots, a sequential order of the plurality of active slots, and the PRB slot threshold value.

* * * * *